United States Patent [19]
Patterson

[11] 3,760,768
[45] Sept. 25, 1973

[54] CAGE APPARATUS

[75] Inventor: Carol M. Patterson, Bryan, Tex.

[73] Assignee: Research Equipment Company, Inc., Bryan, Tex.

[22] Filed: Mar. 13, 1972

[21] Appl. No.: 233,922

[52] U.S. Cl. ................................. 119/17, 119/96
[51] Int. Cl. ................................. A01k 01/02
[58] Field of Search ............... 119/17, 9, 82, 96, 119/99; 49/249

[56] References Cited
UNITED STATES PATENTS

| | | |
|---|---|---|
| 3,399,654 | 9/1968 | Schroer ........................ 119/17 X |
| 3,292,965 | 12/1966 | Powers ......................... 119/9 X |
| 286,575 | 10/1883 | Barnes .......................... 119/82 |

Primary Examiner—Hugh R. Chamblee
Attorney—Pravel, Wilson & Matthews

[57] ABSTRACT

Cage apparatus for housing an animal such as a primate including, top, bottom, front, rear and opposing side walls; the rear wall being movable toward the front wall in order to further confine the animal within the cage; threaded shaft members mounted with the side walls for synchronized rotation; and, advance means mounted with the rear wall and threadedly engaging the threaded shaft members whereby rotation of such shaft members moves the rear wall toward front wall of the cage until the primate is restrained against movement.

10 Claims, 6 Drawing Figures

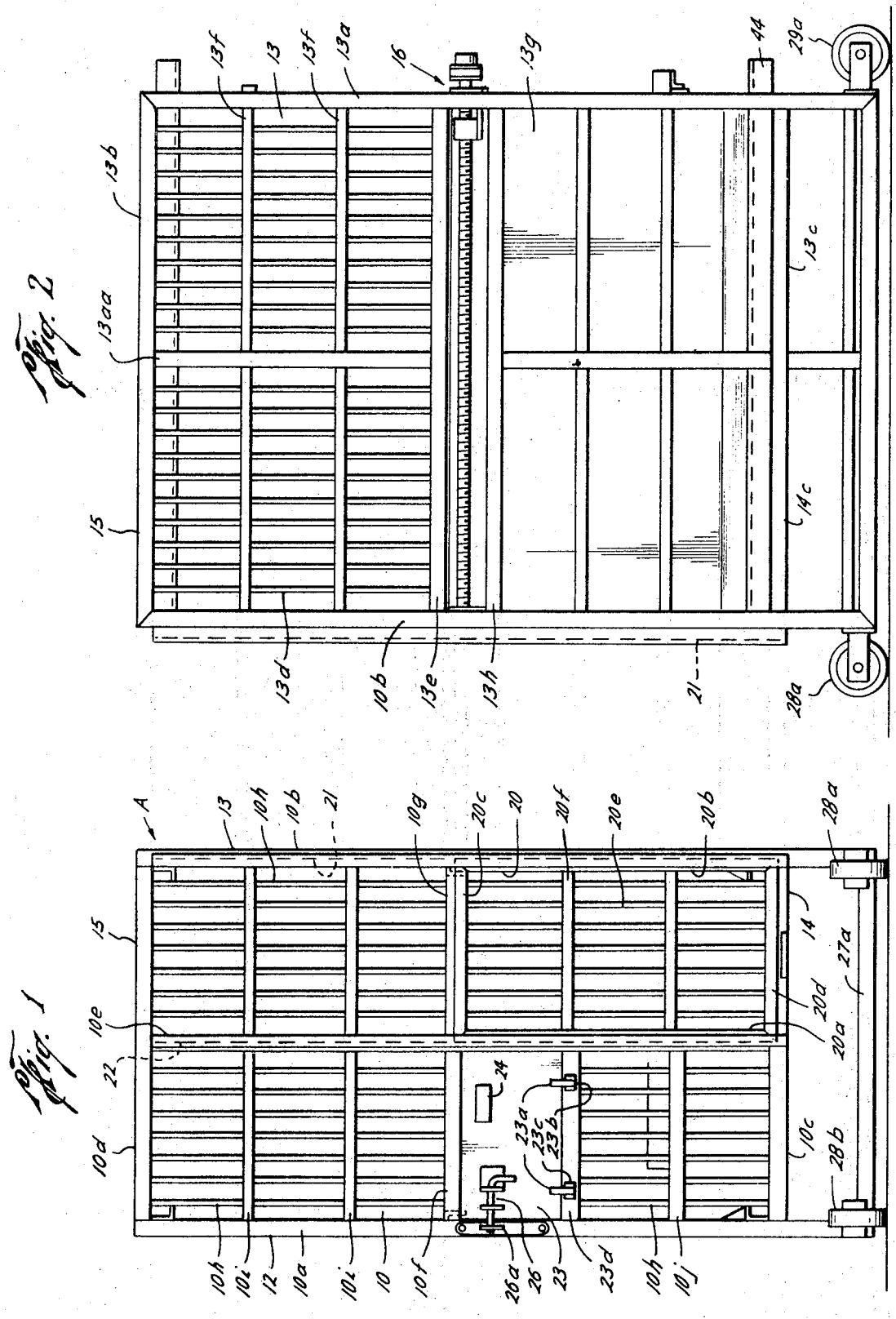

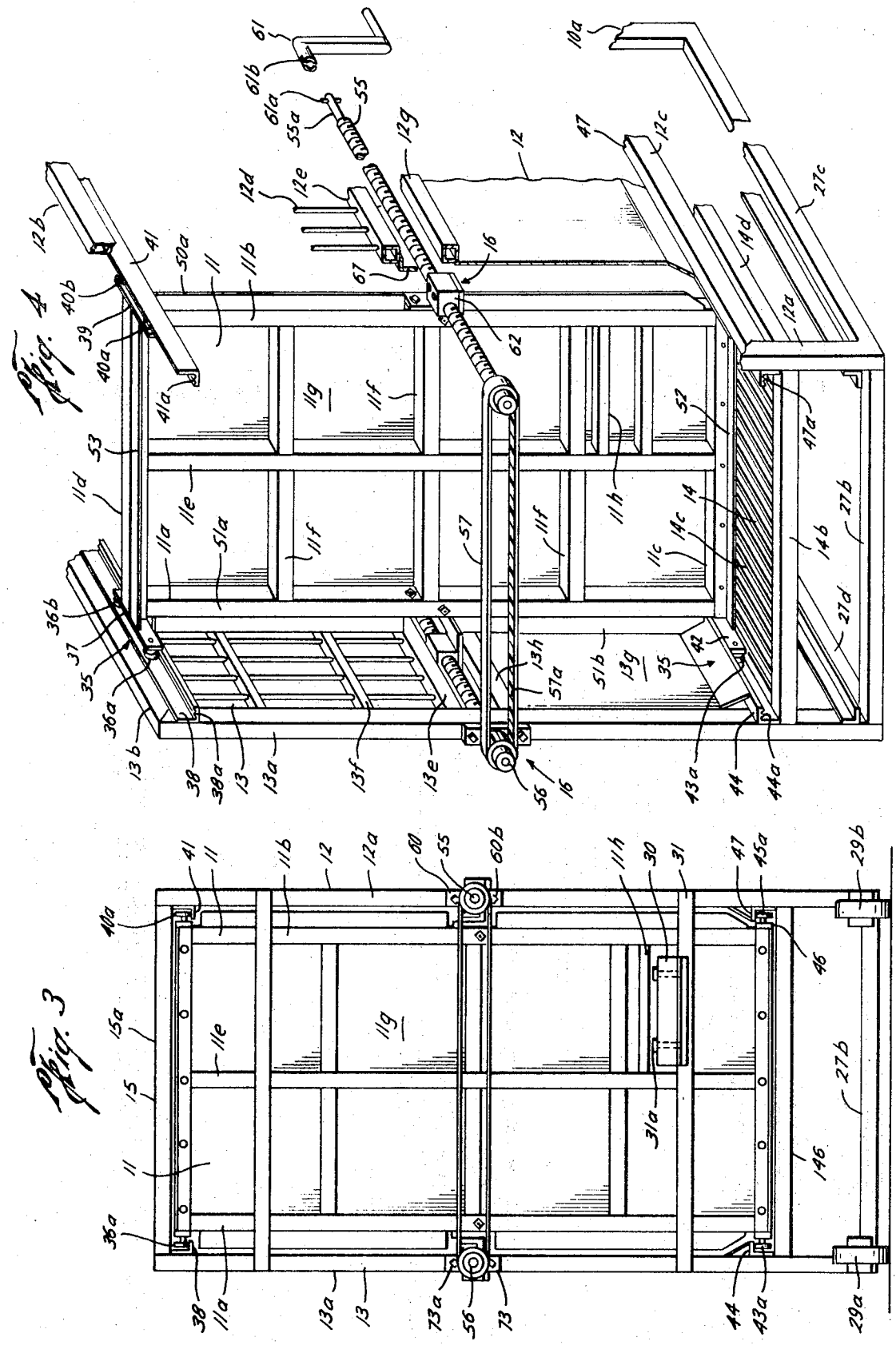

CAGE APPARATUS

BACKGROUND OF THE INVENTION

The field of this invention is animal cages, particularly of the type used for confining primates.

The role of the primates such as gorillas, orangutans, and chimpanzees is becoming increasingly important in medical research. Such animals are extremely strong and thus very difficult to handle, even when confined to a cage. In order to administer injections, take blood samples and otherwise closely work with a caged primate, it is desirable to move on cage wall toward an opposite cage wall until the space therebetween is so confining that the animal is restrained from dangerous movements.

Various attempts have been made to devise an animal cage with a movable wall for restraining the animal. U.S. Pat. No. 3,399,654, issued to Schroer, disclosed a rear wall which is movable by means of chain and sprocket drives. The chains are attached to the rear wall and tend to become misaligned with the sprockets under the blows and other resistance of the primate to the moving wall. Some animal cages include a rear wall which is movable by means of a single threaded nut and rotating shaft combination. The movable rear wall is connected with the threaded shaft by means of a nut that is threadedly mounted with the shaft such that rotation of the shaft moves the nut and rear door attached thereto. In such cages, the rear wall may become so bent or misaligned under the force of the primate such that the single threaded shaft cannot move the rear wall.

SUMMARY OF THE INVENTION

The present invention relates to a new and improved animal cage in which the rear wall moves smoothly toward the front wall in spite of the physical resistance of the caged animal. The animal cage of this invention includes top, bottom, front, rear and opposing side walls for confining the animal. The rear wall is mounted for movement toward the front wall by means of a plurality of rollers mounted with the wall and rollingly engaging upper and lower tracks running along the side walls. In this manner the rear wall is maintained in rolling engagement with the tracks even though the animal resists movement thereof.

A rear wall advance means including a pair of laterally spaced threaded shafts and traveling nuts mounted thereon and with the rear wall serves to move the rear wall smoothly and without misalignment even though subjected to the violence of the primate confined in the cage. Rotation of the shafts is synchronized, preferably by a belt means which engages the shafts whereby rotation of one of the shafts causes both shafts to rotate and move the rear wall smoothly toward the front wall. The lateral spacing of the shafts allows the shafts to be positioned away from food and droppings which might cause malfunctioning.

BRIEF DESCRIPTION OF THE DRAWINGS

FIG. 1 is a front elevational view of the animal cage of the preferred embodiment of this invention;

FIG. 2 is a side elevational view of the animal cage;

FIG. 3 is a rear elevational view of the animal cage;

FIG. 4 is a rear perspective view of the animal cage with the rear wall advanced toward the front wall;

DESCRIPTION OF THE PREFERRED EMBODIMENT

Figure 5:
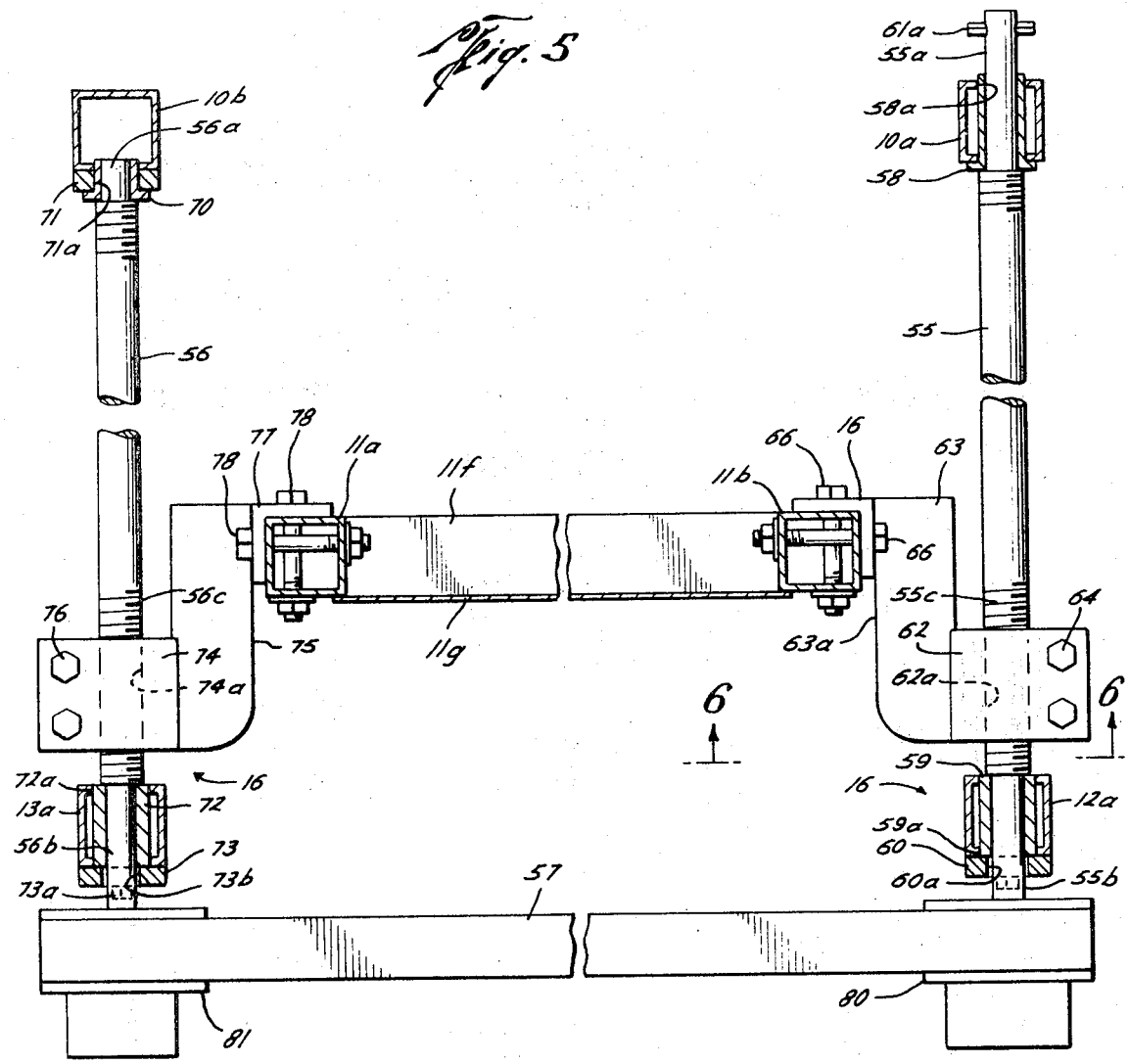
FIG. 5 is a sectional view illustrating the advance mechanism of the invention.
Figure 6:
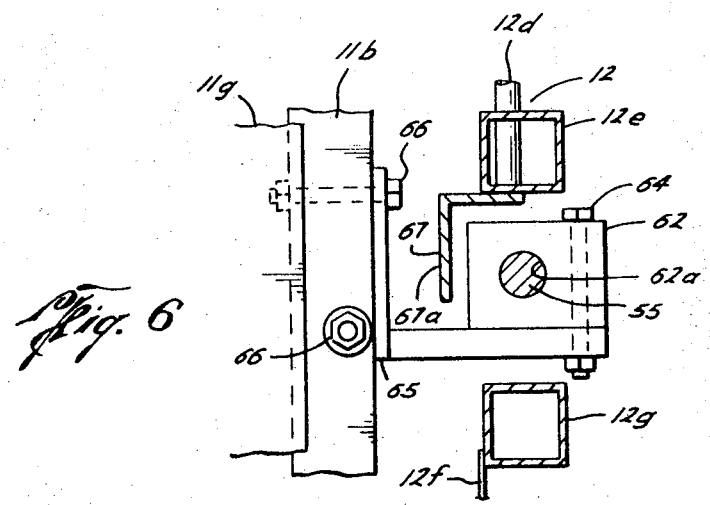
FIG. 6 is a fragmentary sectional view taken along line 6—6 of FIG. 5 illustrating details of the preferred connection of the traveling nut to the rear wall.

With reference to the drawings, the letter A generally designates an animal cage for confining an animal such as a primate for medical research or other reasons. The animal cage A basically includes a front wall 10, a rear wall 11, opposing side walls 12 and 13, a bottom wall 14 and a top wall 15 which cooperate to provide an entirely enclosed area for confining the primate. In the preferred embodiment of this invention, an advance means generally designated as 16 is provided for moving the rear wall 11 toward the front wall 10 in order to restrain the movement of the primate whenever necessary for the purposes of administering injections, taking blood samples or performing other tasks which require a researcher to work in close proximity to the primate.

The front wall 10 includes vertical frame members 10a and 10b which are connected to horizontal frame members 10c and 10d by welding or other suitable means. A vertical frame member 10e is attached to the upper and lower frame members 10d and 10c and a horizontal frame member 10f is attached to vertical frame members 10a and 10c; another horizontal frame member 10g is connected to the vertical frame members 10e and 10b to cooperate with the horizontal frame member 10f to provide an intermediate horizontal support for the front wall 10. A plurality of vertical rods 10h are mounted within the front wall framework for providing the necessary means for confining the animal within the front wall. For example, the plurality of rods within the portion of the front wall defined by frame members 10a, 10e, 10d and 10f are mounted in support bars 10i and are welded to the horizontal frame members 10d and 10f with the support bars 10i being welded to the vertical frame members 10a and 10e.

A vertically sliding guillotine door 20 is formed by vertical frame members 20a and 20b which are connected with horizontal frame members 20c and 20d which provide a rectangular frame to support a plurality of rods 20e which are welded or otherwise attached to the upper and lower frame members 20c and 20d, respectively, and held in position by support bars such as 20f, which are welded or otherwise attached to the frame members 20a and 20b. The door 20 is mounted on track members 21 and 22 which are attached to vertical frame members 10b and 10e, respectively, such that the door may be raised and lowered in order to provide an entrance and exit for the primate.

A solid panel 23 includes lugs 23a which pivotally mount the panel 23 on bolts 23b which are mounted on studs 23c which extend from horizontal bar 23d. A handle 24 is provided for pulling the panel inwardly and outwardly in order to provide an opening through which food and water may be given to the primate. A bolt type latch generally designated as 26 extends through a lug 26a mounted on vertical frame member 10a of the front wall 10 in order to secure the panel in the closed position. It is understood that the solid panel 23 may be replaced by feeding apparatus such as an automatic water feeder and an automatic food feeder if desired.

Side wall 13 includes a vertical frame member 13a which is connected with vertical frame member 10b by means of upper horizontal frame member 13b and lower horizontal frame member 13c. The upper portion of the side wall 13 includes a plurality of rods 13d which are welded to the upper frame member 13b and to an intermediate vertical frame member 13e, the plurality of rods 13b being supported therebetween by horizontal bars 13f which are welded to the vertical frame members 10b and 13a and to intermediate vertical frame member 13aa. The lower portion of the side wall 13b includes a sheet 13g of metal which is welded or otherwise attached to the vertical frame members 10b and 13a and onto intermediate horizontal frame member 13h which is welded to the vertical frame members 10b and 13a, and lower or bottom frame member 13c.

Side wall 12, which is identical in design to side wall 13, includes vertical frame members 10a and 12a which are connected by welding or other suitable means to top frame member 12b and bottom frame member 12c. The upper portion of the wall 12 includes a plurality of rods 12d which are welded to an intermediate horizontal frame member 12e and to the top frame member 12b. The lower portion of the side wall 12 includes a sheet of metal 12f which is welded or otherwise mounted with the bottom frame member 12c, the side or vertical frame members 12a and 10a and intermediate frame member 12g.

The bottom 14 of the animal cage A includes the front frame member 10c, rear frame member 14b, and side frame members 14c and 14d which are welded to the vertical frame members 10a, 10b, 13a and 12a. A plurality of rods 14c are welded to frame members 10c and 14b to provide a bottom on which the animal may stand or rest. In a similar manner a top 15 includes a rear frame member 15a which is welded or otherwise attached to the side frame members 12b and 13b and to the front frame member 10b of the front wall 10 in order to provide a rectangular frame into which a plurality of rods (not shown) are mounted in a manner similar to the bottom wall 14.

The vertical frame members 10a, 10b, 12a and 13a actually provide a supporting frame work for the entire animal cage A. As mentioned with respect to the top wall 15 of the cage, vertical frame members 10a, 10b, 12a and 13a are connected by front and rear frame members 10d, and 15a, respectively, and by side frame members 12b and 13b. Similarly, bottom frame members including front frame member 27a, rear frame member 27b, and side frame members 27c and 27d are welded or otherwise attached to the vertical frame members 10a, 10b, 12a and 13a in order to provide a bottom rectangular framework on which the animal cage A is supported. Front rollers 28a and 28b are attached to front bottom frame member 27a by a conventional support and rear rollers 29a and 29b are mounted with rear bottom frame member 27b in a similarly conventional manner. By use of the rollers 28a, 28b, 29a and 29b, the animal cage may be easily moved from one location to another as desired. The rollers are also provided with suitable lock mechanisms to lock the rollers in position such that the animal cannot by his efforts within the cage move the cage about. A perch board 30 is mounted at the rear of the cage by means of horizontal bar 31 which is welded or otherwise attached to the rear vertical frame members 12a and 13a. The perch board 31 may be suitably attached to the horizontal support bar 31 by any suitable means such as bolts 31a. The perch board 30 is attached to the front wall 10 by means of a bolt connection (not shown) or other suitable connection to support bar 10j.

Referring to FIGS. 3–4, the rear wall 11 is composed of side vertical frame members 11a and 11b which are welded or otherwise connected to bottom horizontal frame member 11c and upper horizontal frame member 11d to provide a rectangular frame for the rear wall 11. An intermediately disposed vertical frame member 11e is welded to the top and bottom frame members 11d and 11c, respectively, and a plurality of horizontal support members 11f are connected to the side vertical frame members 11a and 11b and the intermediate vertical frame member 11e. A metal sheet 11g is attached to the frame members 11a, 11b, 11c and 11d, as well as intermediate frame members such as 11e and 11f, to provide a rear wall which is solid except for an opening 11h through which the perch board 30 extends.

Mounting means generally designated as 35 mount the rear wall 11 for movement along the side walls 12 and 13 toward and away from the front wall 10 for restraining movement of the caged primate whenever necessary. Rollers 36a and 36b are mounted for rotation on a bar 37 which is welded or otherwise attached to the upper end of the vertical frame member 11a of the rear door 11. The support bar 11 is positioned such that the rollers 36a and 36b are in rolling engagement with a track angle 38. The track angle 38 is L-shaped and is mounted onto the vertical frame members 10b and 13a and extends therebetween on the top frame member 13b of the side wall 13. The track angle 38 includes a ridge 38a which extends along the length thereof such that the rollers 36a and 36b, which have a corresponding groove therein (not shown), are maintained on the track 38. In a similar manner, a support bar 39 is attached to the upper end of the vertical frame member 11b of the rear wall 11 by any suitable means such as welding. The support bar 39 has rollers 40a and 40b mounted thereon for rotation and, a track angle 41 is mounted onto the vertical frame members 12a and 10a and extends along the upper side wall frame member 12b whereby the rollers 40a and 40b rollingly engage the track angle 41. The track angle 41 is an L-shaped member identical to the track angle 38 and includes a ridge 41a which maintains the grooved wheels 40a and 40b on the track 41 as the rear wall 11 is moved along the track angles.

The bottom of the rear wall 11 is mounted for movement along the side walls 12 and 13 in a manner similar to the top of the rear wall 11. A horizontal support bar 42 includes rollers such as 43a and is attached by any suitable means such as welding to the bottom end of the vertical frame member 11a. The rollers such as 43 extend tinto rolling engagement with a track angle 44, the track angle 44 having a ridge 44a in order to receive and maintain the grooved rollers such as 43a in rolling engagement. In a similar manner, two rollers such as 45a are mounted for rotation by means of a horizontal support bar 46 which is welded or otherwise attached to the bottom end of the vertical frame member 11b of the rear wall 11. The grooved rollers 45a rollingly engage a ridged track angle 47 that is attached to the vertical frame member 12a and 10a and extends horizontally therebetween.

The combination of the upper track mounting assemblies, such as rollers 36a and 36b that rollingly engage track 38, with the lower track assemblies, such as rollers 43a that rollingly engage track 44, cooperate to mount the rear wall 11 for rolling engagement toward and away from the front wall 10 in spite of any force or resistance applied by the caged primate therein. The use of such upper tracks as 38 and 41 in combination with lower tracks 44 and 47 cause the rear door to resist both downward and upward forces, respectively, such that the door will move along the tracks even though the caged primate may be resisting such movement.

There is a tendency among primates, to attempt to place appendages such as fingers between the rear door 11 and the side walls 12 and 13 in order to attempt to resist movement of the rear door 11. Of course, the caged primate would very likely harm himself if he were to get a finger lodged between the rear wall 11 and the side walls 12 or 13 as the rear wall is moved. In order to prevent such harm to the animal, edge protecting flanges 50a and 50b are welded or otherwise connected to the vertical frame member 11b of the side wall 11 and extend outwardly therefrom into very close proximity to the side wall 12. In a similar manner, edge protecting flanges 51a and 51b are mounted by welding or other suitable means to the vertical frame member 11a of the side wall 11 and extend outwardly therefrom into close proximity to the side wall 13. A bottom L-shaped flange member 52 is bolted onto bottom frame member 11c of the rear wall 11 and extends downwardly into close proximity to the plurality of rods 14e of the bottom wall 14 in order to prevent the primate from lodging a finger between the rear wall 11 and the bottom wall or floor 14. Similarly, top L-shaped flange member 53 prevents the primate from lodging a finger between top wall 15 and rear wall 11.

The advancing means 16 for moving the rear wall 11 toward and away from the front wall 10 basically includes a first shaft 55 mounted with side wall 12 for rotation with respect thereto and a second shaft 56 mounted with side wall 13 for rotation with respect thereto. The shafts 55 and 56 are synchronized in rotation by a belt member 57 which is mounted for rotation with both the shafts 55 and 56 thereby causing the rear wall 11, which is attached to the shafts in a manner to be hereinafter described, to move toward or away from the front wall 10.

The shaft 55 is a threaded steel shaft that is mounted in vertical frame members 10a and 12a of the side wall 12 for rotation therein. A sleeve bearing 58 is mounted over front end portion 55a of the shaft 55 and extends into a hole 58a in the vertical frame portion 10a in order to support the front end 55a of the shaft for rotation. In a similar manner a sleeve bearing 59 is mounted over the shaft rear end portion 55b and extends into a hole 59a in a vertical frame member 12a such that the shaft 55 is mounted for rotation with respect to the frame members 10a and 12a of the side wall 12. A support plate 60 having an aperture 60a therein is mounted over the rear end portion of the shaft 55 and is attached to the vertical frame member 12a by means of bolts 60b. In order to rotate the shaft 55, a crank 61 or other suitable operating means, manual or powered, is operably connected to the front end 55a of the shaft 55, when the crank 61 is used, the crank is mounted over the front shaft end 55a such that notches 61 align with pins 61a so that the shaft 55 can be rotated by turning the crank 61.

A traveling nut 62 having a threaded opening 62a therein is threadedly mounted over threaded portion 55c of the shaft 55 and is attached as explained hereinafter, to the rear wall 11 such that rotation of the shaft 55 will cause the traveling nut 62 and the rear wall to move along the side wall 12. An L-shaped mounting plate 63 (FIG. 5) is attached by nut and bolt combinations 64 to the traveling nut and, an angle 65 is welded or otherwise attached to side 63a of the mounting plate 63 such that the angle extends vertically upwardly therefrom. The angle 65 is positioned to fit about the vertical frame member 11b of the rear wall 11 and is mounted therewith by nut and bolt combinations 66. In this manner, the nut 62 is moved along the shaft 55 whereby the rear wall 11 attached or mounted with the nut 55 is also moved along the shaft. A guard shield angle 67 is welded or otherwise attached to the underside of the horizontal frame support 12e of the side wall 12 and includes a portion 67a which extends downwardly and over the rotating shaft in order to prevent a caged primate from getting tangled in the mechanism.

The front end portion 56a of shaft 56 has a sleeve 70 mounted thereon; and, the sleeve 70 extends into a hole 71a in a plate 71. The plate 71 is attached to the vertical frame member 10b in order to provide additional support to the shaft 56 for rotation of the shaft. The rear portion 56b of the shaft 56 has mounted thereon a sleeve 72 which extends into a hole 72a in the rear vertical frame member 13a. A plate 73 is attached by bolts 73a to the vertical frame member 13a and includes an aperture 73b through which the rear portion 56b of the shaft 56 extends.

A traveling nut 74 includes a threaded opening 74a through which the threaded portion 56c of the shaft 56 extends. The nut 74 is connected with the rear wall 11 in the same or similar manner to that described above for the connection of the nut 62 to the rear wall 11. Thus, an L-shaped member 75 is attached to the underside of the traveling nut by means of bolts 76; and, a vertical angle member 77 is welded or otherwise attached to the L-shaped mounting plate 75 and extends vertically upwardly about two faces of the vertical frame member 11a of the rear wall 11. The vertical angle member 77 is attached to the vertical frame member 11a by means of nut and bolt combinations 78 whereby rotation of the rod 56 moves the traveling nut 74 and thus the rear wall 11 connected thereto.

The rotation of the shaft members 55 and 56 is preferably synchronized by means of a steel, reinforced rubber belt 57 having gear teeth 57a positioned on the inside thereof. The belt 57 is mounted for rotation with both shafts 55 and 56 by means of drive cylinders or gears 80 and 81 which are mounted for rotation with shafts 55 and 56, respectively. The gears or sprockets 80 and 81 may have gear teeth thereon which correspond to the teeth 57a of the endless belt 57 such that the endless belt 57 transmits the rotation of the shaft 55 to shaft 56. However, gear teeth on the gears 80 and 81 may not be necessary if the frictional driving engagement between the belt 57 and the drive cylinders 80 and 81 is sufficient for transmitting the rotation of one shaft 55 to the other shaft 56. The rear wall 11 is thus moved smoothly and evenly along the side walls 12 and 13 toward and away from the front wall 10. The utilization of traveling nuts 62 and 74 at both sides of the rear wall 11 serves to provide multiple laterally spaced support and driving areas for the rear wall to offset resistance offered by the caged primate and to help prevent the wall from being bent out of its substantially perpendicular position with respect to the side walls 12 and 13.

Many of the primates such as great apes, gorillas, orangutans, chimpanzees, gibbons as well as some of the larger members of the monkey family such as baboons, mandrills, and drills, are being used more and more in medical research. These animals possess a combination of comparatively high intelligence and tremendous physical strength in proportion to their size. For example, chimpanzees possess a compressive strength in the hand grip and lifting strength in the arms and shoulders which is considered to be six times the strength of a man on an equal body weight basis. The chimpanzee may further possess the reasoning of a 6 year old human which of course complicates the handling. In order for medical research to be carried out, injections, blood samples and other medically and research oriented functions must be performed on the caged primates on a regular basis. Therefore, it is extremely necessary that some type of cage be provided which will allow a technician to temporarily confine the caged primate such that the primate is restrained from movement.

The animal cage A of the preferred embodiment of this invention, which is sometimes called a "squeeze back" type of cage, allows a technician to restrain the caged primate quickly and efficiently without causing any harm to the primate. Whenever it is necessary to restrain the primate, the technician attaches the crank 61 to the front portion 55a of the shaft 55 by means of the pin 61a. Thereafter, the technician rotates the crank 61 thereby rotating shafts 55 and 56 in synchronism through the belt 57. Rotation of the shafts 55 and 56 in synchronism cause the traveling nuts 62 and 74 to advance toward the front wall at the same rate thereby causing the rear wall 11 to advance evenly and smoothly toward the front wall 10. Of course, the caged primate may violently resist the movement of the rear wall 11 toward the front wall 10; however, the mounting of the rear wall on rollers such as 36a and 40a on upper track angles 38 and 41 in combination with the mounting of the rollers such as 43 and 45a on the lower track angles 44 and 47, respectively, serve to maintain the rear wall in position for being moved toward and away from the front wall. The driving of the rear wall from both sides by means of the aluminum nuts 62 and 74 also serves to steady and support the rear wall against any resistance offered by the caged primate.

If desired, the rate of advance of the rear wall with respect to the front wall may be adjusted by changing the size of the threads on the shafts 55 and 56 and in the traveling nut holes 62a and 74a, assuming that the number of turns of the crank 61 remains constant.

The materials used in the animal cage A are principally extruded aluminum pieces. For example, the vertical frame members 10a, 10b, 12a and 13a are square, extruded tubular members. The plurality of rods such as 10h are solid, circular aluminum rods which are also extruded. The shafts 55 and 56 are steel while the traveling nuts 62 and 64 are aluminum. The principal means of connecting various frame members in the animal cage A is welding; however, it is understood that other means may be used such as bolts and nut combinations. The angle members such as the tracks 38, 41, 44 and 47 are also extruded aluminum members.

The foregoing disclosure and description of the invention are illustrative and explanatory thereof, and various changes in the size, shape and materials as well as in the details of the illustrated construction may be made without departing from the spirit of the invention. For example, it should be understood that the synchronized shaft mechanism of the animal cage A of this invention may be utilized in other types of animal cages, principally in animal cages where it is desired to occasionally confine the animal to a sufficiently small area that the animal is restrained from movements which may cause harm to either the animal or to a technician.

I claim:

1. A cage apparatus for housing primates such as gorillas and chimpanzees, comprising:
    a housing including a top, bottom, front, rear and opposing side walls providing an enclosed area for confining such primates;
    rollers mounted on said rear wall at the side thereof both at the top and bottom of said rear wall;
    side tracks mounted on said opposing side walls at the top and bottom thereof, said rollers extending into rolling engagement with said side tracks;
    first and second laterally spaced, threaded shaft members extending along said opposing side walls and mounted for rotation with respect thereto;
    first and second threaded nuts attached to said sides of said rear wall;
    said first threaded shaft member extending into threaded engagement with first nut and said second threaded shaft member extending into threaded engagement with said second nut whereby rotation of said first and second shaft members move said rear wall toward said front wall; and
    a first gear means mounted with said first threaded shaft and a second gear means mounted with said second threaded shaft; and
    a belt member operatively connected with said first and second gear means.

2. The structure set forth in claim 1, wherein:
    said belt member is a steel reinforced rubber belt.

3. The structure set forth in claim 1, including:
    a. first bearing means mounted with said one side wall for mounting said first threaded shaft for rotation; and
    b. second bearing means mounted with said other side wall for maintaining said second threaded shaft for rotation.

4. The structure set forth in claim 1, including:
    manually operated means for rotating said first shaft member whereby said first and second shaft members rotatingly cooperate to move said rear wall.

5. The structure set forth in claim 1, including:
    edge protecting means mounted on said rear wall and extending into substantial proximity to said side walls to prevent harm to said animal as said rear wall is moved toward said front wall.

6. The structure set forth in claim 1, including:
    each of said side tracks having mounted therewith a guard shield positioned between said rear door and said threaded shafts.

7. The structure set forth in claim 1, including:

protective side guards mounted on said side of said rear door, each of said protective side guards extending outwardly into close proximity to said walls.

8. The structure set forth in claim 1, including:
a bottom protective flange member mounted onto said bottom of said rear wall; and
a top protective flange member mounted at said top of said rear wall.

9. The structure set forth in claim 1, wherein:
said rollers are mounted with but spaced from said rear wall in order to maintain said rear wall in a vertical position even under stress.

10. The structure set forth in claim 1, includes:
said side track mounted at said top of said side walls has a track surface disposed below said rear wall rollers mounted at the top of said rear wall; and
said side track mounted at said bottom of said side wall has a track surface disposed above said rollers mounted at said bottom of said rear wall.

* * * * *